United States Patent
Chen

(10) Patent No.: US 6,324,131 B1
(45) Date of Patent: Nov. 27, 2001

(54) LOW GLIDE MAGNETO-OPTICAL RECORDING MEDIUM

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/433,378

(22) Filed: Nov. 3, 1999

Related U.S. Application Data

(60) Provisional application No. 60/114,802, filed on Jan. 4, 1999.

(51) Int. Cl.[7] .................................................. G11B 11/00
(52) U.S. Cl. ............................................. 369/13; 428/64.3
(58) Field of Search ............................... 369/13, 14, 110, 369/116, 275.2; 428/64.1, 64.3, 694 ML, 694 PR, 694 BP, 695

(56) References Cited

U.S. PATENT DOCUMENTS

| | | |
|---|---|---|
| 4,737,408 | 4/1988 | Kuwahara et al. . |
| 4,777,068 | 10/1988 | Omata et al. . |
| 4,925,733 | 5/1990 | Imataki et al. . |
| 5,053,288 | 10/1991 | Hashimoto et al. . |
| 5,506,023 | 4/1996 | Ohmori et al. . |
| 5,534,322 | 7/1996 | Ueyama et al. . |
| 5,540,988 | 7/1996 | Tachibana et al. . |
| 5,576,087 | 11/1996 | Watanabe et al. . |
| 5,580,633 | 12/1996 | Kuwahara et al. . |
| 5,604,005 | 2/1997 | Endo et al. . |
| 5,618,617 | 4/1997 | Uchida et al. . |
| 5,633,746 | 5/1997 | Sekiya et al. . |
| 5,637,393 | 6/1997 | Ueda et al. . |
| 5,674,638 | 10/1997 | Grill et al. . |
| 5,763,071 | 6/1998 | Chen et al. . |
| 5,776,602 | 7/1998 | Ueda et al. . |
| 5,786,078 | 7/1998 | Sekiya et al. . |
| 5,814,418 | 9/1998 | Nishikiori et al. . |
| 5,821,004 | 10/1998 | Hino et al. . |
| 5,824,387 | 10/1998 | Boutaghou et al. . |
| 5,825,723 | 10/1998 | Hirokane et al. . |
| 5,837,357 | 11/1998 | Matsuo et al. . |
| 5,853,871 | 12/1998 | Kitaori et al. . |
| 5,858,520 | 1/1999 | Uchiyama . |
| 5,858,536 | 1/1999 | Yanagisawa . |
| 5,914,198 | 6/1999 | Miyamoto et al. . |
| 5,946,281 * | 8/1999 | Ito et al. ............................... 369/112 |
| 6,055,222 * | 4/2000 | Knight .................................. 369/112 |
| 6,104,675 * | 8/2000 | Hatam-Tabrizi ....................... 369/13 |
| 6,181,478 * | 1/2001 | Mandella ............................. 359/642 |

\* cited by examiner

Primary Examiner—Tan Dinh
(74) Attorney, Agent, or Firm—McDermott, Will & Emery

(57) ABSTRACT

Low glide magneto-optical (LGMO) information storage and retrieval media having improved tribological properties when used in ultra-high density storage/retrieval devices employing very small head flying heights on the order of less than about 1 microinch are formed in a front surface magneto-optical (FSMO) configuration utilizing a substrate having a highly polished surface, on which a layer stack comprising a rare earth-transition metal thermo-magnetic (RE-TM) magneto-optical (MO) layer is formed. Enhanced wear and abrasion resistance is provided by an ultra-thin, protective flash layer overcoat (FLO)/lubricant topcoat layer system on the media surface. Embodiments of the present invention include forming the FLO layer of an amorphous, abrasion-resistant, diamond-like, carbon-based material selected from $CN_x$, $CH_x$, and $CN_xH_y$, and providing the lubricant topcoat on the FLO layer as an about 15–25 Å thick layer of a fluoropolyether or perfluoropolyether material, the surface of which is subjected to post-deposition buffing and tape-wiping for enhancing low glide performance.

20 Claims, 1 Drawing Sheet

LOW GLIDE MAGNETO-OPTICAL RECORDING MEDIUM

CROSS-REFERENCE TO PROVISIONAL APPLICATION

This application claims priority from provisional patent application Serial No. 60/114,802 filed Jan. 4, 1999, the entire disclosure of which is incorporated herein by reference.

CROSS-REFERENCE TO RELATED APPLICATIONS

This application discloses subject matter similar to subject matter disclosed in co-pending U.S. patent applications: Ser. No. 09/433,377, filed on Nov. 3, 1999; Ser. No. 09/433,375, filed on Nov. 3, 1999; and Ser. No. 09/433,376, filed on Nov. 3, 1999.

FIELD OF THE INVENTION

The present invention relates to the recording, storage, and reading of information utilizing low glide magneto-optical ("LGMO") media, particularly rotatable LGMO storage media, such as in the form of thin film disks, for use with a cooperating transducer and/or sensor head or similar device

BACKGROUND OF THE INVENTION

In recent years, much research and development of magneto-optical (MO) recording media for use as high density/high capacity memory and data storage and retrieval devices has been carried out. Such media typically comprise a suitable substrate, e.g., of glass, polymer, metal, or ceramic material, coated with a perpendicularly magnetizable film used as a recording medium. Information is recorded within the medium by switching the direction of magnetization of desired portions (i.e., domains) of the perpendicularly magnetizable film. More specifically, for recording information, the recording medium is first initialized by applying to the medium a magnetic field from an externally positioned magnetic field generation device (i.e., external magnetic bias), thereby making the direction of the perpendicular magnetization uniformly upwardly or downwardly facing. A first laser beam of sufficiently high power or intensity from a suitable source, e.g., a laser diode, is then irradiated on desired recording portions of the recording medium in the presence of an externally applied magnetic bias field. As a consequence of the laser beam irradiation, the temperature of the irradiated portions (domains) of the recording medium rises, and when the temperature reaches or exceeds the Curie point of the vertically magnetizable film or its magnetic compensation point, the coercive force on the recording portion becomes zero or substantially zero. When this state is achieved at the desired recording portions of the medium, and in the presence of the externally biased magnetic field, the direction of the perpendicular magnetization is switched, e.g., from upwardly facing (=digital logic 1 or 0) to downwardly facing (=digital logic 0 or 1, respectively) or vice versa, so as to be aligned with that of the external magnetic field. At the end of a write pulse (i.e., laser pulse), the temperature of the heated recording domain then decreases and eventually returns to room temperature by cessation of the laser beam irradiation thereof Since the alignment direction of magnetization of the recording media effected by the laser pulse heating to above the Curie temperature is maintained at the lowered temperature, desired information can thus be recorded in the magneto-optical media.

For reading the information stored in the MO media according to the above-described method, the recorded portions of the media are irradiated with a second, linearly polarized laser beam of lower power or intensity than the one used for recording, and light reflected or transmitted from the recorded portions is detected, as by a suitable detector/sensor means. The recorded information is read out by detecting the Kerr rotation angle of the polarization plane of light reflected from the recording layer or the Faraday rotation angle of the polarization plane of light transmitted through the recording layer. More particularly, since the rotation angle of the polarization plane varies depending upon the direction of magnetization of the recorded portions of the media according to the Kerr or Faraday effect, information stored within the media can be read out optically by a differential detector which decodes the polarization-modulated light beam into bits of information.

Conventional MO recording technology typically utilizes a transparent substrate and the polarized, lower intensity laser beam is transmitted through the recording medium layers for reception by the detector/sensor means for measurement of the rotation angle of the transmitted polarized light via the Faraday effect, as explained supra. However, in first surface magneto-optical (FSMO) recording systems, polarized, lower intensity laser beam light is reflected from the MO medium for measurement of the amount of rotation of the plane of the polarized laser light via the Kerr effect, again employing a suitable detector/sensor means. The FSMO type system is advantageous in that, inter alia, opaque substrate materials, e.g., polymers, can be utilized, and dual-sided media are readily fabricated. In addition, FSMO-type media can advantageously utilize such less expensive polymeric substrates with a pre-formatted servo pattern easily formed on the surface thereof by a masking and injection molding process, therefore not requiring electronic servo as in conventional hard disk drive technology.

In addition to the above-mentioned advantages, the direct irradiation of the MO layer(s) of FSMO-configured media via the front side also results in several other advantages vis-à-vis through-the-substrate illumination, e.g., FSMO systems can utilize head sliders flying over the disk surface by forming the optical and magnetic components integral with the slider, whereby the laser beam is irradiated through the slider body and directly focussed on the MO read-write layer. The recording density of MO disks, including FSMO-configured disks, depends, in major respect, on the spot size of the focussed laser beam(s) employed for writing (and reading-out) information stored in the MO medium layer(s). The minimum spot size or diameter d is limited by diffraction according to the relation $d=0.5\ \lambda/NA$, where $\lambda$ is the wavelength of the laser light and NA is the numerical aperture of the objective lens of the focussing system. In MO systems utilizing conventional technology, i.e., wherein laser irradiation of the MO medium layer is through a transparent substrate, head-disk spacings are typically in the range of hundreds of microns. However, as indicated supra, first surface magneto-optical (FSMO) systems utilizing non-transparent substrates can be devised in which a flying head slider integrally incorporates the requisite optical and magnetic components. In systems of such configuration, the laser beam passes through the slider body and is directly focussed on the MO storage medium layer. Near-field optical techniques have been developed for use with such systems in order to overcome the above-mentioned diffraction limit by using a high refractive index material as a solid immersion lens ("SIL"), which SIL is positioned between the objective lens and the FSMO disk. In such systems, the laser beam spot size or diameter is determined by the aperture size of the SIL, which aperture size can be much smaller than that possible with conventional optical focussing systems.

The spacing, or air-gap, between the SIL and the FSMO disk surface is termed the "flying height" for flying-head recording. In the past, most research on FSMO systems utilizing SIL-type optics was directed towards achieving a flying height of about 5 microinches (127 nm). However, the continuing requirement for greater recording/storage density with good coupling efficiency necessitates further decrease in the flying height of such FSMO-based storage systems, such systems and media therefor being termed low glide magneto-optical ("LGMO") systems and media.

Such LGMO recording media, when fabricated in disk form for rotation about a central axis, can be adapted for use in conventional Winchester, or hard drive, devices as are employed with conventional magnetic recording media. As indicated above, hard drives typically employed for such disk-shaped media utilize flying heads for mounting transducer/sensor devices, etc., thereon, for close positioning thereof adjacent the surface of the recording media. In operation, a typical contact start/stop (CSS) method commences when a data transducing head begins to slide against the surface of the disk as the disk begins to rotate. Upon reaching a predetermined high rotational speed, the head floats in air at a predetermined small distance from the surface of the disk, where it is maintained during reading and recording operations. Upon terminating operation of the disk drive, the head again begins to slide against the surface of the disk and eventually stops in contact with and pressing against the disk. Therefore, as in the case of magnetic disks, a protective overcoat layer and a lubricant topcoat layer are typically applied to the disk surface for minimizing scratching and abrasion of the sensor/transducer head and the recording media surface, which can result in an undesirably high wear rate of the head and recording media surface.

However, in the case of portable LGMO recording devices, the use of a lubricating oil, e.g., a fluorocarbon-based oil, is problematic in that it is difficult to maintain the lubricating oil on the surface of the medium, thereby increasing surface scratching and wear. In addition, a FSMO-configured LGMO disk produced without lubricating oil on its surface by a given manufacturer is not necessarily compatible with similar media produced with lubricating oil by another manufacturer.

In another approach for minimizing abrasion, scratching, and wear of transducer heads, a solid lubricant is applied to the bottom surface of the flying head which comes into contact with the surface of the recording medium. However, such solid lubricant applied to the bottom surface of the flying head must have a durability many times greater than lubricant applied to the recording medium. As a consequence, application of solid lubricant only to the flying head is not sufficient for adequately reducing abrasion, scratching, and wear.

An additional difficulty encountered in the development of wear-resistant, lubricated, ultra-high recording density FSMO-configured LGMO recording media and Winchester-type drives therefor, is the above-mentioned requirement imposed by the impetus for achieving ever-higher density recording, which necessitates even further reduction in the disk-transducer/sensor spacing and mandates good coupling efficiency. The head-to-disk interface (HDI) becomes very critical as head-to-disk spacing is reduced and head fly height decreases. Conventional MO and FSMO media without a protective overcoat and lubricant layer have extremely poor tribological performance, resulting in lack of reliability of MO-based disk drives.

The above-described problems, including disk crashing during head loading, associated with the requirement for reduced head-to-disk spacing and fly height, are further exacerbated in the case of FSMO-configured LGMO media wherein the optical and magnetic components of the recording system are incorporated into the head slider.

Thus, there exists a need for reliable, high recording density single- and dual-sided FSMO-configured LGMO disks and disk-based devices including a protective overcoat/lubricant topcoat layer system, which LGMO disks allow operation with flying heads at substantially reduced flying heights and which effectively eliminate the problems and drawbacks associated with the conventional technology, i.e., scratching, abrasion, brittleness, increased wear of transducer/sensor head and recording media surfaces, and tendency for crashing during head loading, while advantageously providing good coupling efficiency.

The present invention addresses and solves the problems attendant upon the manufacture and use of high density FSMO-configured, disk-shaped LGMO recording media and hard drives, while maintaining full compatibility with all mechanical aspects of conventional disk drive technology.

DISCLOSURE OF THE INVENTION

An advantage of the present invention is an ultra-high density, low glide FSMO-configured LGMO recording/data storage and retrieval medium for use with flying heads operating at extremely low flying heights, while at the same time exhibiting, good coupling efficiency, improved tribological performance and long-term durability.

Another advantage of the present invention is a method of operating a disk-shaped, ultra-high density, LGMO recording/data storage and retrieval system having a flying head slider at a fly height less than about 1 microinch above the disk surface with reduced wear and increased coupling efficiency, A further advantage of the present invention is an ultra-high density, LGMO recording/data storage and retrieval medium having an improved protective overcoat/lubricant topcoat layer system permitting operation at substantially reduced head flying heights.

Yet another advantage of the present invention is an ultra-high density, disk-based, LGMO recording/data storage and retrieval system providing improved performance at decreased head-to-disk spacings on the order of about 1 microinch or less.

Still another advantage of the present invention is single- and dual-sided, ultra-high density, LGMO recording/data storage and retrieval media having protective overcoat layer/lubricant topcoat layer systems thereon providing improved tribological performance.

Additional advantages and other features of the present invention will be set forth in the description which follows and in part will become apparent to those having ordinary skill in the art upon examination of the following or may be learned from practice of the present invention. The advantages of the present invention may be realized and obtained as particularly pointed out in the appended claims.

According to one aspect of the present invention, the foregoing and other advantages are obtained in part by a first surface magneto-optical (FSMO)-based low glide magneto-optical (LGMO) recording/data storage and retrieval medium, comprising:

(a) a substrate having at least one polished major surface; the medium further including at least one stack of layers, comprising, in sequence from the at least one polished major surface of the substrate:

(b) a heat sinking and reflective layer;

(c) a first dielectric layer comprising a material which is substantially transparent to the wavelength(s) of at least one laser beam used for writing and reading-out information stored in the medium;

(d) a magneto-optical (MO) read-write layer;

(e) a second dielectric layer comprising a material which is substantially transparent to the wavelength(s) of at least one laser beam used for writing and reading-out information stored in the medium;

(f) a thin, amorphous, abrasion-resistant, diamond-like, carbon-based protective flash layer overcoat (FLO) over the transparent dielectric layer, the FLO layer being substantially transparent to the wavelength(s) of the at least one laser beam used for writing and reading-out information stored in the medium; and (g) a thin lubricant topcoat layer on the FLO layer;

wherein the LGMO medium is usable with a flying head at a fly height of less than about 1 microinch ($\mu$in.).

According to embodiments of the present invention, the substrate (a) includes a pair of polished, opposed major surfaces and comprises a material selected from the group consisting of aluminum, plated aluminum, aluminum alloys, metals, metal alloys, glass, ceramics, and glass-ceramics composites.

According to specific embodiments of the present invention, the substrate (a) comprises NiP-plated aluminum (Al) having a polished surface roughness Ra of from about 5 Å to about 7 Å or a glass or ceramic material having a polished surface roughness Ra of from about 3 Å to about 5 Å; the FLO layer (f) is less than about 100 Å thick, e.g., less than about 10 Å thick, and comprises a material selected from the group consisting of: a-$CN_x$, a-$CH_x$, and a-$CN_xH_x$; the thin lubricant topcoat layer (g) comprises a polymeric fluoropolyether or perfluoropolyether lubricant material and has a thickness of from about 15 Å to about 25 Å and the exposed surface thereof is buffed by tape-burnishing and then tape-wiped to improve low glide performance; the heat sinking and reflective layer (b) comprises aluminum (Al) or an alloy thereof selected from the group consisting of: Al—Cr, Al—Ti, Al—Cu, and Al—Mo; each of the first and second substantially transparent dielectric layers (c) and (e) comprises a material selected from the group consisting of $SiN_x$, $AIN_x$, $SiO_x$, and $AlO_x$, and the MO read-write layer (d) comprises a rare earth/transition metal thermo-magnetic (RE-TM) material having perpendicular anisotropy, magnetic moment and large perpendicular coercivity which are temperature dependent, high Curie temperature, and infinitely high coercivity and zero magnetic moment at the compensating temperature, the RE-TM material being selected from the group consisting of: TbFe, TbFeCo, TbFeCoX, where X is Al, Y, or Nd, and DyFeCoX, where X is Al, Y, or Nd.

According to further embodiments of the present invention, the medium comprises another layer stack, identical to the above said layer stack, formed on the other one of the pair of opposed, polished major surfaces of the substrate.

According to another aspect of the present invention, a first surface magneto-optical (FSMO)-based low glide magneto-optical (LGMO) recording/data storage and retrieval medium comprises:

(a) a substrate having at least one polished major surface having a surface roughness Ra of from about 3 Å to about 7 Å;

the medium further comprising at least one stack of layers, including, in sequence from the at least one polished major surface of the substrate:

(b) a heat sinking and reflective layer;

(c) a first dielectric layer comprising a material which is substantially transparent to the wavelength(s) of at least one laser beam used for writing and reading-out information stored in the medium;

(d) a magneto-optical (MO) read-write layer;

(e) a second dielectric layer comprising a material which is substantially transparent to the wavelength(s) of the at least one laser beam used for writing and reading-out information stored in the medium;

(f) a thin, amorphous, abrasion-resistant, carbon-based, diamond-like protective flash layer overcoat (FLO) over the second substantially transparent dielectric layer, the FLO layer being substantially transparent to the wavelength(s) of the at least one laser beam used for writing and reading-out information stored in the medium; and (g) a thin lubricant topcoat layer on the FLO layer, the lubricant topcoat layer comprising a fluoropolyether polymer material or a perfluoropolyether polymer material, and the exposed surface of the lubricant topcoat layer is buffed by tape burnishing and then tape-wiped for improving low glide performance, the LGMO medium being usable with a flying head at a fly height of less than about 1 $\mu$ in.

According to yet another aspect of the present invention, a method of operating a low glide magneto-optical (LGMO) recording/data storage and retrieval system comprises:

providing an LGMO disk having at least one planar major surface;

rotating the LGMO disk about a central axis perpendicular to the at least one planar major surface; and positioning a flying head slider proximate the at least one planar major surface of the disk at a fly height less that about 1 $\mu$ in. above the surface.

According to embodiments of the present invention, the flying head slider is positioned at a fly height of about 0.7 $\mu$ in. above the surface; and the LGMO disk comprises:

(a) a substrate having at least one polished major surface having a surface roughness Ra of from about 3 Å to about 7 Å;

the disk further including at least one stack of layers, comprising, in sequence from the at least one polished major surface of the substrate:

(b) a heat sinking and reflective layer;

(c) a first dielectric layer comprising a material which is substantially transparent to the wavelength(s) of at least one laser beam used for writing and reading-out information stored in the LGMO disk;

(d) a magneto-optical (MO) read-write layer;

(e) a second dielectric layer comprising a material which is substantially transparent to the wavelength(s) of the at least one laser beam used for writing and reading-out information stored in the LGMO disk;

(f) a thin, amorphous, abrasion-resistant, diamond-like, carbon-based protective flash layer overcoat (FLO) over the second substantially transparent dielectric layer, the FLO layer being substantially transparent to the wavelength(s) of the at least one laser beam used for writing and reading-out information stored in the LGMO disk; and (g) a thin lubricant topcoat layer on the FLO layer, the thin lubricant topcoat layer comprising a fluoropolyether polymer material or a perfluoropolyether polymer material, the exposed surface of the lubricant topcoat layer being buffed by tape burnishing and then tape-wiped for improving low glide performance.

According to still another aspect of the present invention, a low glide magneto-optical (LGMO) data storage and retrieval system comprises:

a disk-shaped LGMO data storage and retrieval medium having a surface; and means for positioning a flying head slider at a fly height less than about 1 microinch away from the LGMO disk surface.

Additional advantages of the present invention will become readily apparent to those skilled in the art from the following detailed description, wherein only preferred embodiments of the invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not as limitative.

BRIEF DESCRIPTION OF THE DRAWINGS

The following detailed description of the embodiments of the present invention can best be understood when read in conjunction with the following drawing, wherein.

Figure 1:
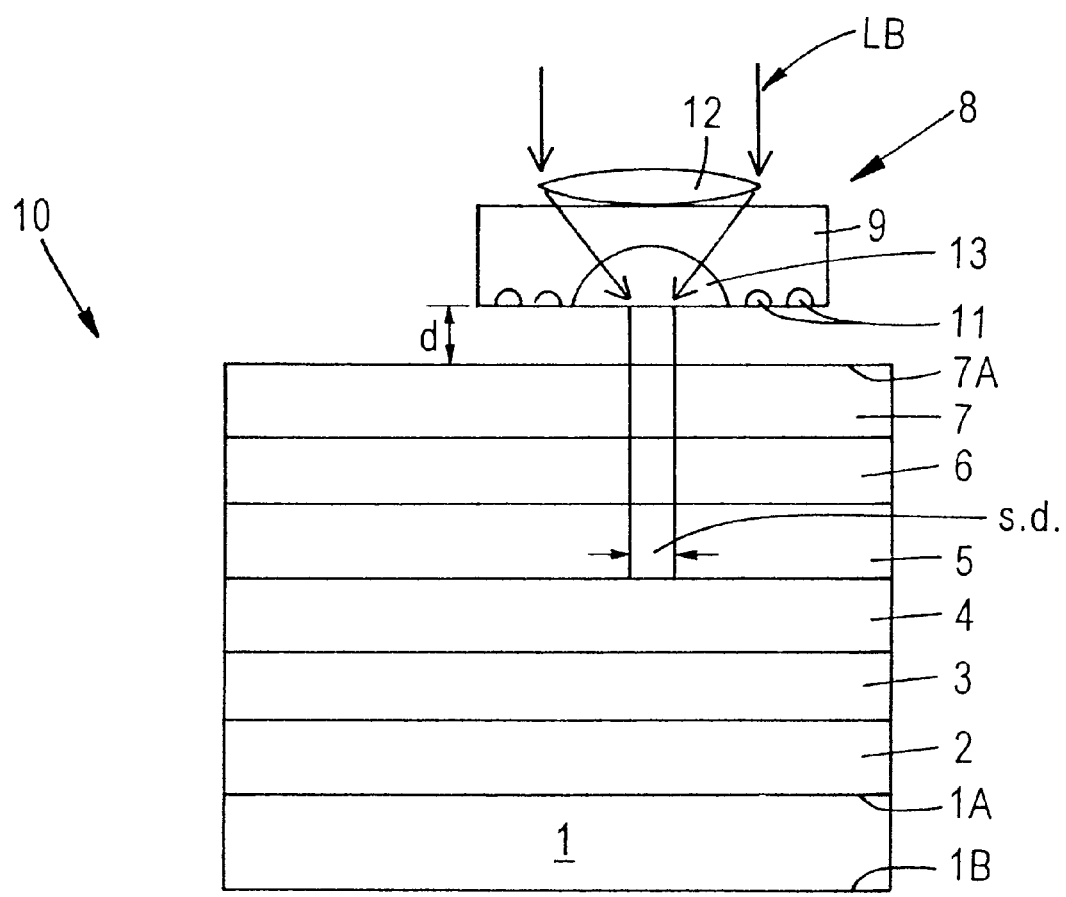
FIG. 1 illustrates, in simplified, cross-sectional schematic form, a FSMO-based LGMO medium according to an embodiment of the present invention.

It should be recognized that the various layers forming the layer stack or laminate illustrated in the appended figure as representing cross-sections of portions of a FSMO medium fabricated according to the inventive methodology are not drawn to scales but instead are drawn as to best illustrate the features of the present invention.

DESCRIPTION OF THE INVENTION

The present invention is based on the discovery that ultra-high recording density, low glide magneto-optical (LGMO) media can be obtained by appropriate combination of a highly polished substrate surface and a thin "flash-layer" protective overcoat ("FLO")/ burnished lubricant topcoat layer system. More specifically, specific combinations of polished substrate and FLO protective layer/burnished lubricant topcoat layer systems can provide optimal tribological performance of first surface magneto-optical (FSMO) type media, such as disks, with minimal lubricant topcoat layer thicknesses and head-to-disk spacings (i.e., flying heights) less than about 1 $\mu$ in. (25.4 nm), e.g., 0.7 $\mu$ in. (0.18 nm) when employed with SIL systems providing very small laser beam spot sizes.

According to the present invention, in order to achieve the stated objectives of low glide and good tribological performance, at least one surface of a suitable substrate material, e.g., of aluminum, plated aluminum, aluminum alloy, metal, metal alloy, glass, ceramics, or a glass-ceramic composite, is subjected to a fine polishing, as by, for example, mechanical polishing, chemical-mechanical polishing (CMP), or similar techniques known in the art, to achieve a prescribed surface roughness Ra, typically from about 3 Å to about 7 Å, the various layers constituting the front surface magneto-optical (FSMO) medium are sequentially deposited thereon by techniques known in the art, e.g., sputtering, and a thin flash-layer protective overcoat (FLO) comprising an amorphous, hard, carbon-based, abrasion-resistant protective material, e.g., a carbon-based, diamond-like material such as a-$CN_x$ (where x=0.05–0.30), a-$CH_x$ (where x=0.20–0.30), and a-$CN_xH_y$ (where x=0.03–0.10 and y=0.15–0.30), is formed to cover an uppermost substantially transparent dielectric layer, typically a $SiN_x$ material, formed over the MO write and read-out layer of the FSMO medium. The amorphous, diamond-like FLO layer has a thickness not greater than about 100 Å, e.g., less than about 10 Å, and can be formed by any of the physical vapor deposition (PVD) or chemical vapor deposition (CVD) methods conventionally employed for depositing such type layers. By way of illustration, but not limitation, a-$CH_x$ layers may be deposited on suitable dielectrically coated MO media substrates by AC sputtering of a 3 by 15 inch graphite target at frequencies in the range of 40–400 KHz at a power in the range of 0.5–2 KW in an atmosphere of 15% $H_2$/85% Ar. Similar conditions may be employed for forming a-$CN_x$ and a-$CN_xH_y$ coatings by use of $N_2$ and $H_2$—$N_2$ mixtures, respectively. Given the present disclosure and the objectives of the invention, determination and selection of the parameters necessary for obtaining equivalently performing diamond-like amorphous carbon-containing FLO layers and coatings by other conventional film-forming techniques is considered within the ambit of the artisan for use in a particular situation.

The lubricant topcoat layer formed over the protective overcoat layer, in embodiments according to the present invention, comprises fluoropolyether or perfluoropolyether polymer materials such as, for example, perfluoropolyethylene (PFPE), and like materials available under the tradenames Fomblin ZDol, Fomblin Z Tetraol, and Fomblin Z-Dol TX from Ausimont, Thorofare, N.J., and has a thickness not greater than about 25 Å, e.g., from about 10 Å to about 25 Å.

The lubricant topcoat layer can be applied in any conventional manner, as by dipping in a dilute solution of the lubricant in a suitable solvent, e.g., a hydrofluorocarbon, or by spraying, etc. Desirably, the surface of the disk is preliminarily treated to be free of impurities so that good bonding can occur between the functional end groups of the lubricant polymer molecules and the substrate surface (i.e., the FLO layer). The bonding of the lubricant to the surface of the disk can be enhanced by e.g., cleaning the surface of the protective overcoat layer with a mild plasma or a solvent rinse prior to applying the lubricant, thermal bonding utilizing an oven, or UV-initiated bonding.

According to the present invention, the lubricant-coated medium is subjected to post-lube tape-burnishing and tape-wiping processing to enhance tribological performance at ultra-low glide heights. Tape-burnishing (i.e., buffing) can be performed with a tape coated with a fine abrasive slurry, e.g., 0.3 $\mu$m alumina ($Al_2O_3$) particles (such as is available from Mipox, Hayward, Calif., while applying a predetermined loading force (e.g., 0.8 lb) to remove carbon asperities from the substrate (e.g., disk) surfaces to improve low glide performance. The tape-burnished substrate surfaces are then subjected to a tape-wiping process, e.g., utilizing a cotton tape (such as is available from Texwipe Co., Upper Saddle River, N.J.), to maintain disk cleanliness with minimal soft errors.

An embodiment of an LGMO medium and system according to the present invention comprises a single-sided, ultra-high recording density, LGMO medium 10 utilizing a first surface magneto-optical (FSMO) type configuration employing the inventive combination of polished surface substrate and flash layer protective overcoat (FLO)/ tape burnished and wiped lubricant topcoat layer system and is illustrated in FIG. 1, wherein reference numeral 1 denotes a diskshaped substrate comprising a pair of major, planar, opposed surfaces 1A and 1B. The substrate material may be include, for example, aluminum (Al), plated aluminum, aluminum alloys, metals, metal alloys, glass, ceramics, and glass-ceramics composites. The thickness of substrate 1 is not critical, but should provide adequate rigidity during rotation and static periods. Typically, at least one of the major, planar, opposed surfaces, 1A in the illustration, is subjected to lapping and fine polishing, as by conventional techniques not described herein for brevity, to achieve a preselected surface roughness Ra. By way of illustration, but not limitation, for Al disk substrates having an about 10 $\mu$m thick electrolessly plated layer of NiP thereon, the preselected surface roughness Ra is in the range from about 5 Å to about 7 Å, whereas for glass or ceramic disk substrates, Ra is in the range from about 3 Å to about 5 Å.

Formed on a first one (1A) of the opposing major surfaces of substrate 1 is a layer stack, comprising, in overlying sequence from substrate surface 1A: (a) a reflective, heat-sinking layer 2, typically about 300–700 Å thick, preferably about 500 Å thick, typically comprising Al or an alloy thereof, e.g., AlCr, AlTi, AlCu, AlMo, etc. Layer 2 may also serve to prevent laser beam transmission through the substrate 1 when the latter is transparent, as in the case of glass or glass-based materials, and thus render surface 1A opaque; (b) a first dielectric material layer 3, typically about 100–400 Å thick, preferably about 100–200 Å thick, and substantially transparent to the wavelength(s) of the at least one laser beam employed for writing and reading out information stored in the medium, typically selected from $SiN_x$ (where x=ca. 0.8–1.33), $AlN_x$ (where x=ca. 1–1.5), $SiO_x$ (where x=ca. 1–2.0), and $AlO_x$ (where x=ca. 1–1.5); (c) a MO read-write layer 4, for example, comprising a rare earth-transition metal thermo-magnetic (RE-TM) material, typically about 200–300 Å thick, e.g., about 250 Å thick, and having perpendicular anisotropy, large perpendicular coercivity $H_c$ at room temperature, and high Curie temperature $T_c$, typically selected from TbFe, TbFeCo, TbDyFeCo, TbFeCoX, and TbDyFeCoX, where X is Al, Y, or Nd, and DyFeCoX, where X is Y, Nd, or Al (for example, TbFeCo normally has a Curie temperature $T_C$ in the range of about 150 to about 300° C., at which the magnetic moment of the domain disappears as the temperature thereof reaches $T_C$ as a result of irradiation by the focussed laser beam). The RE-TM material also has a special feature of reaching infinitely high coercivity and zero magnetic moment at the compensating temperature $T_{comp}$, in the range of about 50 to about 100° C. for TbFeCo. The temperature range between $T_{comp}$ and $T_C$ is employed for overwriting the data bits, the carrier-to-noise ratio (CNR) being proportional to the Kerr rotation angle and the reflectivity of the medium; (d) a second substantially transparent dielectric material layer 5, typically about 200–1000 Å thick, e.g., about 800 Å thick for red laser light and about 400 Å thick for blue laser light, and transparent to the wavelength(s) of the at least one laser beam employed for writing and reading out information, typically selected from $SiN_x$, $AlN_x$, $SiO_x$, or $AlO_x$, where x in each instance is as given above for layer 3; (e) a thin, amorphous, diamond-like, protective flash overcoat layer (FLO) 6, typically not greater than about 100 Å thick, e.g. less than about 10 Å thick and designed to be substantially transparent to the wavelength(s) of the laser beam(s) utilized during writing and reading-out operations while improving mechanical and tribological performance of the head-disk interface ("HDI") of the LDMO system. FLO layer can 6 comprise a material as described supra, i.e., a-$CN_x$ (where x=0.05–0.30), a-$CH_x$ (where x=0.20–0.30), or a-$CN_xH_y$ (where x=0.03–0.10 and y=0.15–0.30); and (f) a lubricant topcoat layer 7, typically having a thickness of from about 15 Å to about 25 Å and comprising a fluoropolyether or perfluoropolyether polymer material, e.g., perfluoropolyethylene (PFPE), the surface 7A of which has been tape-burnished (buffed) to remove carbon-based asperities and tape-wiped, as described above.

Also illustrated in FIG. 1 is a head slider 8 positioned at a head-to-disk spacing d above surface 7A of layer 7 of LGMO medium 10, head slider 8 being formed with integrally mounted optical focussing/detector-sensor and magnetic bias field systems, and comprising a head slider body 9; magnetic coils 11 for applying a magnetic bias field to MO recording layer 4; objective lens 12, solid immersion lens ("SIL") 13; and optoelectric sensor means (not shown). In operation, laser beam LB (from a laser source not shown for illustrative simplicity) is focussed by the combination of objective and solid immersion lenses 12, 13 into a narrow, collimated beam having very small spot size or diameter s.d., which beam can be utilized for writing and reading-out stored information from MO layer 4.

EXAMPLE

LGMO media were prepared on NiP electrolessly-plated Al, glass, and ceramic substrates according to the procedures described above, including post-lube tape-burnishing and tape-wiping. A glide tester comprising a glide head equipped with either a piezo-electric transducer ("PZT") or an acoustic-emission ("AE") was utilized for studying how low the head can fly over the surface of the disk by detecting and measuring the number and/or frequency of "contact-hits" by the head when flying over the disk surface. Good glide testing with zero contact hits was achieved with LGMO media prepared according to the invention at a head-to-disk spacing d at 0.7 $\mu$ in. (18 nm) for both NiP/Al and glass substrates.

With continued reference to FIG. 1, the optical coupling efficiency of the illustrated LGMO system is a function of the numerical aperture (NA) and the flying height (or head-to-disk spacing) d. Minimum laser spot size or diameter s.d. requires the shortest possible wavelength $\lambda$ and the highest NA material. However, the coupling efficiency decreases very rapidly when the flying height d exceeds 40 nm. Therefore, the optimal manner by which minimum spot size s.d. and good coupling efficiently can be obtained is by design of media with lowest possible glide height, i.e., LGMO media as hereinabove described. As compared with other recording media, LGMO media with less than 0.7 $\mu$ in. (18 nm) glide height, e.g., less than about 0.5 $\mu$ in. for substrates with Ra in the range of from about 2 Å to about 3 Å, can advantageously provide ultra-high recording density. LGMO media as described herein can provide an areal recording density as high as 45 Gb/in$^2$. However, by using glass substrates and Co/Pt superlattice structures as multilayer MO media, magnetic domains as small as 60 nm can be realized. Accordingly, recording densities with such LGMO media can reach about 100–400 Gb/in$^2$ at fly heights of about 0.7 $\mu$ in (e.g., about 100 Gb/in$^2$ for domain diameters of about 60 nm and about 400 Gb/in$^2$ for domain diameters of about 20–30 nm and fly heights less than about 0.5 $\mu$ in.

Another embodiment of the present invention comprises a dual-sided LGMO medium and system corresponding to the single-sided embodiment shown in FIG. 1 and described above. Such dual-sided media advantageously may be operated to record and read out information from both sides of a common substrate, and thus are useful for increasing storage density. The dual-sided embodiment comprises a second layer stack formed on the second, finely polished major surface 1B of substrate 1, in opposing relation to the first layer stack formed on the first major surface 1A, with both layer stacks being identically constituted and processed as described with respect to the single-layer stack embodiment shown in FIG. 1, along with a second, identically configured head slider 8.

Conventional techniques, such as PVD and/or CVD may be employed for depositing each of the reflective, dielectric, read-write, and ultra-thin FLO layers of the layer stacks of the above-described embodiments, with sputtering generally being preferred. The lubricant topcoat layer is readily deposited by conventional dipping techniques, as indicated above. Therefore, details of the deposition techniques utilized for forming each of the layers of the layer stack are generally omitted from the present disclosure for brevity and in order not to unnecessarily obscure the present invention.

Thus, the present invention advantageously provides, as by the use of conventional processing techniques, high quality, tribologically robust, ultra-high recording density, FSMO-based LGMO information and data storage and retrieval media combining a highly polished substrate surface and thin, abrasion-resistant, carbon-based, flash layer protective overcoat (FLO)/burnished lubricant topcoat layer systems suitable for use in high density information storage and retrieval systems and devices operating at heretofore unobtainable minimal head fly heights of less than about 1 microinch.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A low glide magneto-optical (LGMO) recording/data storage and retrieval medium, comprising:
    (a) a substrate having at least one polished major surface;
    said medium further comprising at least one stack of layers, including, in sequence from said at least one polished major surface of said substrate:
    (b) a heat sinking and reflective layer;
    (c) a first dielectric layer comprising a material which is substantially transparent to the wavelength(s) of at least one laser beam used for writing and reading-out information stored in said medium;
    (d) a magneto-optical (MO) read-write layer;
    (e) a second dielectric layer comprising a material which is substantially transparent to the wavelength(s) of the at least one laser beam used for writing and reading-out information stored in said medium;
    (f) a thin, amorphous, abrasion-resistant, diamond-like, carbon-based protective flash layer overcoat (FLO) over said second transparent dielectric layer, said FLO layer being substantially transparent to the wavelength (s) of the at least one laser beam used for writing and reading-out information stored in said medium; and
    (g) a thin lubricant topcoat layer on said FLO layer;
    wherein said LGMO medium is capable of functioning with a flying head at a fly height of less than about 1 microinch.

2. The medium according to claim 1, wherein: said substrate (a) includes a pair of polished, opposed major surfaces and comprises a material selected from the group consisting of aluminum, plated aluminum, aluminum alloys, other metals, other metal alloys, glass, ceramics, and glass-ceramics composites.

3. The medium according to claim 2, wherein:
    said substrate (a) comprises NiP-plated aluminum having a polished surface roughness Ra of from about 5 Å to about 7 Å.

4. The medium according to claim 2, wherein:
    said substrate (a) comprises glass or ceramic material having a polished surface roughness Ra of from about 2 Å to about 3 Å or from about 3 Å to about 5 Å.

5. The medium according to claim 1, wherein:
    said FLO layer (f) comprises a material selected from the group consisting of: a-$CN_x$, a-$CH_x$, and a-$CN_xH_y$.

6. The medium according to claim 5, wherein:
    said FLO layer has a thickness less than about 100 Å.

7. The medium according to claim 5, wherein:
    said FLO layer has a thickness less than about 10 Å.

8. The medium according to claim 1, wherein:
    said thin lubricant topcoat layer (g) comprises a polymeric fluoropolyether or perfluoropolyether lubricant material.

9. The medium according to claim 8, wherein:
    said thin lubricant topcoat layer has a thickness of from about 15 to about 25 Å and the exposed surface thereof is buffed by tape-burnishing and then tape-wiped to improve low glide performance.

10. The medium according to claim 1, wherein:
    said heat sinking and reflective layer (b) comprises aluminum (Al) or an alloy thereof selected from the group consisting of:
    Al—Cr, Al—Ti, Al—Cu, and Al—Mo;
    each of said first and second substantially transparent dielectric layers (c) and (e) comprises a material selected from the group consisting of $SiN_x$, $AlN_x$, $SiO_x$, and $AlO_x$; and
    said MO read-write layer (d) comprises a rare earth/transition metal thermo-magnetic (RE-TM) material having perpendicular anisotropy, magnetic moment and large perpendicular coercivity which are temperature dependent, high Curie temperature, and infinitely high coercivity and zero magnetic moment at the compensating temperature, said RE-TM material being selected from the group consisting of: TbFe, TbFeCo, TbFeCoX, where X is Al, Y, or Nd, and DyFeCoX, where X is Al, Y, or Nd.

11. The medium according to claim 2, comprising another layer stack, identical to the above said layer stack, formed on the other one of said pair of opposed, polished major surfaces of said substrate.

12. A low glide magneto-optical (LGMO) recording/data storage and retrieval medium, comprising:
(a) a substrate having at least one polished major surface having a surface roughness Ra of from about 3 Å to about 7 Å;
said medium further comprising at least one stack of layers, including, in sequence from said at least one polished major surface of said substrate:
(b) a heat sinking and reflective layer;
(c) a first dielectric layer comprising a material which is substantially transparent to the wavelength(s) of at least one laser beam used for writing and reading-out information stored in said medium;
(d) a magneto-optical (MO) read-write layer,
(e) a second dielectric layer comprising a material which is substantially transparent to the wavelength(s) of the at least one laser beam used for writing and reading-out information stored in said medium;
(f) a thin, amorphous, abrasion-resistant, diamond-like, carbon-based protective flash layer overcoat (FLO) over said second transparent dielectric layer, said FlO layer being substantially transparent to the wavelength(s) of the at least one laser beam used for writing and reading-out information stored in said medium; and
(g) a thin lubricant topcoat layer on said FLO layer, said thin lubricant topcoat layer comprising a fluoropolyether polymer material or a perfluoropolyether polymer material, the exposed surface of said lubricant topcoat layer being buffed by tape burnishing and then tape-wiped for improving low glide performance, said LGMO medium being capable of functioning with a flying head at a fly height of less than about 1 $\mu$ in.

13. The medium according to claim 12, wherein said substrate includes a pair of polished, opposed major surfaces and comprises a material selected from the group consisting of: aluminum, plated aluminum, aluminum alloys, other metals, other metal alloys, glass, ceramics, and glass-ceramics composites.

14. The medium according to claim 13, wherein said stack of layers is formed on one of said pair of polished, opposed major surfaces of said substrate, and wherein:
said heat sinking and reflective layer (b) comprises aluminum or an alloy thereof;
each of said first and second substantially transparent dielectric layers (c) and (e) comprises a material selected from the group consisting of: $SiN_x$, $AlN_x$, $SiO_x$, and $AlO_x$;
said MO read-write layer (d) comprises a rare earth/transition metal thermo-magnetic (RE-TM) material having perpendicular anisotropy, magnetic moment and large perpendicular coercivity which are temperature dependent, high Curie temperature, and infinitely high coercivity and zero magnetic moment at the compensating temperature, said RE-TM material selected from the group consisting of: TbFe, TbFeCo, TbFeCoX, TbDyFeCo, and TbDyFeCoX, where X is Al, Nd, or Y, and DyFeCoX, where X is Al, Nd, or Y;
said FLO layer (f) comprises a material selected from the group consisting of: $a\text{-}CN_x$, $a\text{-}CH_x$, and $a\text{-}CN_xH_y$; and
said thin lubricant topcoat layer (g) comprises a fluoropolyether or a perfluoropolyether lubricant material.

15. The medium according to claim 14, comprising another layer stack, identical to the abovesaid layer stack, formed on the other one of said pair of polished, opposed major surfaces of said substrate.

16. A method of operating a low glide magneto-optical (LGMO) disk-based data/information storage and retrieval system, comprising:
providing an LGMO disk having at least one planar major surface;
rotating said LGMO disk about a central axis perpendicular to said at least one planar major surface; and
positioning a flying head slider proximate said at least one planar major surface of said disk at a fly height less than about 1 $\mu$ in. above said surface.

17. The method according to claim 16, comprising:
positioning said flying head slider at a fly height less than about 0.7 $\mu$ in. above said surface.

18. The method according to claim 16, comprising providing an LGMO disk including:
(a) a substrate having at least one polished major surface having a surface roughness Ra of from about 3 Å to about 7 Å;
said disk further including at least one stack of layers, comprising, in sequence from said at least one polished major surface of said substrate:
(b) a heat sinking and reflective layer;
(c) a first dielectric layer comprising a material which is substantially transparent to the wavelength(s) of at least one laser beam used for writing and reading-out information stored in said LGMO disk;
(d) a magneto-optical (MO) read-write layer;
(e) a second dielectric layer comprising a material which is substantially transparent to the wavelength(s) of the at least one laser beam used for writing and reading-out information stored in said LGMO disk;
(f) a thin, amorphous, abrasion-resistant, diamond-like, carbon-based protective flash layer overcoat (FLO) over said second transparent dielectric layer, said FLO layer being substantially transparent to the wavelength(s) of the at least one laser beam used for writing and reading-out information stored in said LGMO disk; and
(g) a thin lubricant topcoat layer on said FLO layer, said thin lubricant topcoat layer comprising a fluoropolyether polymer material or a perfluoropolyether polymer material, the exposed surface of said lubricant topcoat layer being buffed by tape burnishing and then tape-wiped for improving low glide performance.

19. The method according to claim 18, further comprising:
providing an LGMO disk having a second layer stack, identical to the abovesaid layer stack, formed on a second polished major surface thereof opposite said at least one major surface; and
positioning a flying head slider proximate the exposed surface of the lubricant topcoat layer of said second layer stack at a fly height less than about 1 $\mu$ in. from said lubricant topcoat surface.

20. A low glide magneto-optical (LGMO) data/information storage and retrieval system comprising:
a disk-shaped LGMO data/information storage and retrieval medium having a surface; and
means for positioning a flying head slider at a fly height less than about 1 $\mu$ in. away from said LGMO disk surface.

* * * * *